Figure 1:
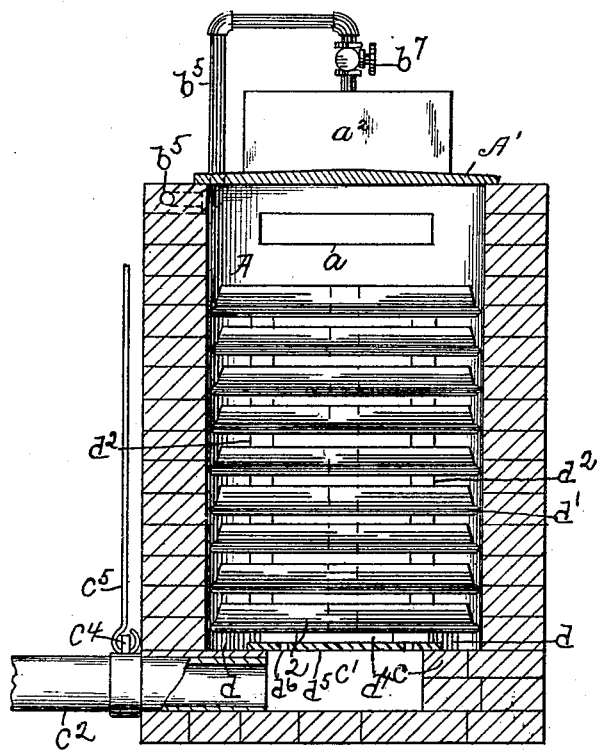

No. 690,212. Patented Dec. 31, 1901.
N. WASHBURN.
FURNACE.
(Application filed Sept. 6, 1900.)
(No Model.)

Witnesses.
C. H. Gannett
J. Murphy

Inventor.
Nathan Washburn
by Jas. H. Churchill
atty.

UNITED STATES PATENT OFFICE.

NATHAN WASHBURN, OF STAFFORD SPRINGS, CONNECTICUT.

FURNACE.

SPECIFICATION forming part of Letters Patent No. 690,212, dated December 31, 1901.

Application filed September 6, 1900. Serial No. 29,136. (No model.)

*To all whom it may concern:*

Be it known that I, NATHAN WASHBURN, a citizen of the United States, residing in Stafford Springs, in the county of Tolland and State of Connecticut, have invented an Improvement in Furnaces, of which the following description, in connection with the accompanying drawings, is a specification, like characters on the drawings representing like parts.

This invention relates to a furnace of novel construction, as will be described, and especially adapted, among other things, for the conversion of white cast-iron into steel after the manner described in United States Patent No. 513,163, granted to me January 23, 1894; and the said furnace is particularly designed and adapted for the production of cast-iron car-wheels having their chilled rim or tread converted into steel, as described in United States Patent No. 513,546, granted to me January 30, 1894.

In accordance with this invention the furnace, which may be made of fire-brick, is provided with preferably two inlets for the hydrocarbon flame, which inlets are located at or near the top of the furnace and substantially diametrically opposite, the chamber of the furnace being preferably circular in form, but which might be square or of any desired shape. The flame-inlets referred to communicate with combustion-chambers preferably made of fire-brick and forming part of the furnace, the said combustion-chambers containing one or more oil-burners, which latter are for the best results substantially such as shown and described in United States Patent No. 418,326, granted to me December 31, 1889.

The furnace is provided for the best results with a single outlet at its bottom, which communicates in practice with a flue or stack by a passage provided with a damper or regulator by which the draft may be controlled, and thereby the heat in the chamber of the furnace in which the wheels or other articles are placed.

The bottom of the furnace may and preferably will be provided with a cover for the flame-outlet, preferably of metal and provided with a plurality of substantially small openings, which afford communication from the main chamber of the furnace to the flame-outlet, but which are made of sufficiently small area to prevent a too-rapid passage of the flame from the main chamber of the furnace, whereby the volume or body of the flame is retarded or held back, so as to obtain immediately above the said cover a heat the same or substantially the same as the rest of the chamber, to thereby subject the under side of the wheel nearest the cover to the same heat as that to which the top of the said wheel is subjected. These and other features of this invention will be pointed out in the claims at the end of this specification.

Figure 2:
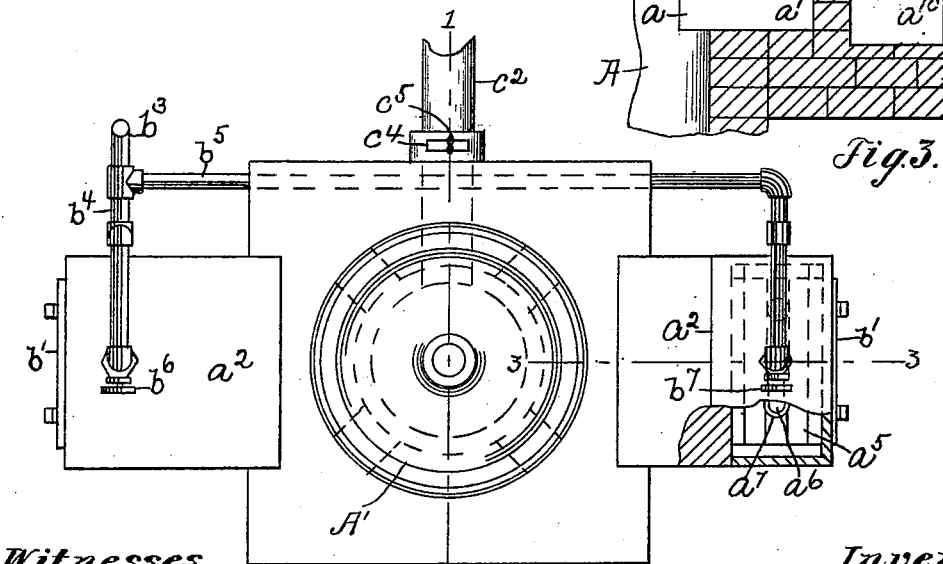

Figure 1 is a vertical section of a furnace embodying this invention, the section being taken on the line 1 1, Fig. 2; Fig. 2, a top or plan view of the furnace shown in Fig. 1, partially broken out to more clearly show some of the working parts; and Fig. 3, a sectional detail through one of the combustion-chambers, the section being taken on the line 3 3, Fig. 2.

The furnace comprises, essentially, a main chamber A, preferably circular in form to correspond to the form of a car-wheel and having its walls made of fire-brick or other suitable material. The chamber A is provided with an opening in its top which is adapted to be closed by a cover $A'$.

The main chamber A in accordance with this invention is provided with, preferably, two flame-inlets $a$, located substantially diametrically opposite and made in the walls of the furnace, near the top of the same. Each flame-inlet $a$ communicates by an irregular passage $a'$ with a combustion-chamber $a^2$, located outside of or beyond the walls of the main chamber and having its walls $a^3$ of fire-brick or other suitable material preferably built up with the walls of the main chamber A. The irregular passage $a'$ comprises, as herein shown, a substantially horizontal lower passage communicating with the flame-inlet $a$ for the furnace, a substantially horizontal passage communicating with the combustion-chamber $a^2$, and a substantially vertical passage connecting said substantially horizontal passages, as clearly shown in Fig. 3.

Each combustion-chamber $a^2$ contains within it one or more hydrocarbon-burners, preferably made as shown and described in my Patent No. 418,326, above referred to, and consisting of a substantially V-shaped pan $a^5$, provided with a continuous slot $a^6$, having its walls $a^7$ extended above and below the bottom of the pan $a^5$, and through which slot the flame and products of combustion arising from the burning oil or hydrocarbon contained in the pan $a^5$ are drawn downward by the draft into the main chamber A through the passage $a'$ and flame-inlet $a$.

Figure 3:
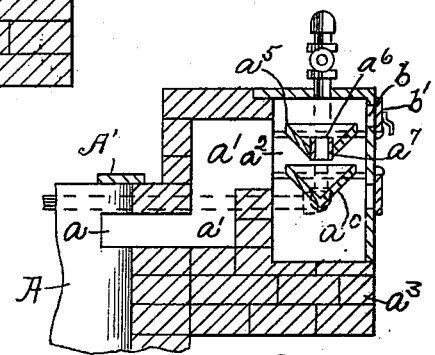

The pan or burner $a^5$ may and preferably will have coöperating with it a second or overflow pan or trough $a^{10}$, which is not provided with a longitudinal slot and which serves to catch any overflow of oil from the burner $a^5$ through the slot $a^6$. The burner $a^5$ and pan $a^{10}$ are suitably supported within the combustion-chamber $a^2$ at their ends and are preferably made of suitable width to leave spaces between their sides and the side walls of the said combustion-chamber, as represented in Fig. 3. Each combustion-chamber is provided with suitable air-inlets $b$, controlled by dampers $b'$, substantially as shown and described in the Patent No. 418,326, referred to.

The burner $a^5$ is preferably located in its combustion-chamber above the level of the flame-inlet, so as to be protected by the wall of the main chamber from the intense heat of the said chamber, and thereby avoid overheating of the burner.

The burners $a^5$ in the combustion-chambers $a^2$ on opposite sides of the furnace may be supplied with hydrocarbon oil, preferably crude-petroleum oil, by a main supply-pipe $b^3$, having branch pipes $b^4$ $b^5$ extended down through the top of the combustion-chambers $a^2$, the said branch pipes being provided with cocks or valves $b^6$ $b^7$, by which the supply of oil to the burners may be controlled.

The branch pipe $b^5$ is preferably extended through the brickwork of the main chambers.

The main chamber A is provided in its bottom $c$ with a substantially large flame-outlet $c'$, preferably circular in shape and communicating with an outlet flue or passage $c^2$, which in practice communicates with a suitable stack or chimney (not shown) and which is provided with a damper or regulator $c^4$, adapted to be operated by a rod $c^5$ or in any other suitable manner, the said damper being preferably located substantially near the outside wall of the main chamber A. The main chamber A is provided at its bottom with a plurality of supports $d$, preferably of fire-brick, upon which rests the bottom or lowest wheel 2 of a series of car-wheels $d'$, superimposed and separated from one another by suitable means interposed between said wheels, which means may be a plurality of loose fire-brick $d^2$.

The supports $d$ are separated from one another, as represented in Figs. 1 and 2, to leave passages or ducts $d^4$, through which the flame may pass to the under side of the lowest wheel 2, and in order that the under side of this lowest wheel may be heated to the same extent as the top of the said wheel and to the same extent as the rest of the wheels in the chamber A the flame-outlet $c'$ is provided with a perforated cover, herein represented as a plate $d^5$, of cast-iron or other suitable metal, having a series of substantially small openings $d^6$, through which the flame may pass into the flame-outlet; but, if desired, the said cover may be made of fire-brick or other suitable refractory material, provided with suitable openings.

The openings $d^6$ afford an outlet for the flame, but retard or restrict the passage of the flame in such manner that the under side of the lowest wheel 2 is subjected to the same or substantially the same heat as the rest of the wheels in the chamber, and as a result all the wheels are heated uniformly.

In operation the wheels are placed in the chamber A after the manner shown in Fig. 1, with the lowest wheel 2 resting on the supports $d$ and the other wheels separated by the bricks $d^2$, the said wheels being placed in the chamber A, so as to leave a free passage for the flame around the wheels and between their rims and the wall of the said chamber. Combustion is then started in the burners and the damper or regulator $c^4$ is opened wide, until the chamber A has been brought to the desired or required heat, which may be determined by the color of the flame in the said chamber, and when the chamber A has been brought to the desired heat the damper or regulator is closed sufficiently to reduce the draft, and the supply of oil is partially cut off to thereby keep the chamber A filled with one substantially solid body or mass of flame practically motionless or possessing so little motion as to appear motionless, so that the wheels are embedded, as it were, in a solid mass or body of flame, which is maintained until the metal has been converted, after which the oil-supply is shut off and the furnace and the wheels therein allowed to cool.

I prefer to employ two flame-inlets on substantially diametrically opposite sides of the chamber A, as a more uniform heating is effected; but good results may be obtained with but one flame-inlet, in which case one of the combustion-chambers and the connection of the same with the main chamber may be omitted.

I claim—

1. A furnace of the character described, comprising a main chamber having an opening at its top and provided on substantially diametrically opposite sides with flame-inlets located near the top of the furnace, combustion-chambers located outside of the main chamber and extended above the said flame-inlets and provided with flame-outlets, substantially vertical passages connecting the flame-outlets for the combustion-chambers with the flame-inlets for said main chamber to prevent unequal heating of the contents in said main chamber, a hydrocarbon-burner in said combustion-chambers, a flame-outlet at the lower portion of the main chamber, and a cover for the main chamber, substantially as described.

2. A furnace of the character described, comprising a main chamber provided with a flame-inlet near its upper portion and with a flame-outlet at its lower portion, a combustion-chamber located outside of the main chamber, above the flame-inlet thereof, an irregular passage connecting the flame-inlet with said combustion-chamber, a hydrocarbon-burner in said combustion-chamber, and a cover for said flame-outlet provided with a plurality of substantially small holes or openings, substantially as described.

3. In a furnace of the character described, the combination of the following instrumentalities, viz: a main chamber provided with a flame-inlet near its upper portion and with a flame-outlet at its lower portion, a combustion-chamber located above the flame-inlet and having its flame-outlet above the flame-inlet for said main chamber, a substantially vertical passage connecting the flame-outlet for said combustion-chamber with the flame-inlet for said main chamber, a hydrocarbon-burner in said combustion-chamber located above the level of the flame-inlet, a flue or passage communicating with the flame-outlet, and a damper or regulator to control said passage, substantially as described.

4. In a furnace of the character described, the combination of the following instrumentalities, viz: a main chamber provided near its top with flame-inlets substantially diametrically opposite, combustion-chambers located above said flame-inlets and having flame-outlets, substantially vertical passages connecting the flame-outlets for the combustion-chambers with the flame-inlets for said main chamber, hydrocarbon-burners in said combustion-chambers located above the said flame-inlets, a flame-outlet at the lower portion of said main chamber, and an outlet flue or passage communicating with the said flame-outlet and provided with a damper or regulator, substantially as described.

5. In a furnace of the character described, the combination of the following instrumentalities, viz: a main chamber provided near its top with flame-inlets substantially diametrically opposite, combustion-chambers located above said flame-inlets and communicating with the main chamber through said flame-inlets, hydrocarbon-burners in said combustion-chambers located above the flame-inlets, a substantially large flame-outlet in the bottom of said main chamber, a cover for said flame-outlet provided with a plurality of substantially small holes or openings, independent supports at the bottom of the main chamber, a flue or passage communicating with the flame-outlet, and a damper or regulator to control the passage of the flame from the main chamber, substantially as described.

In testimony whereof I have signed my name to this specification in the presence of two subscribing witnesses.

NATHAN WASHBURN.

Witnesses:
E. H. LATHROP,
J. F. CARMODY.